United States Patent
Kalwa

(10) Patent No.: US 9,670,390 B2
(45) Date of Patent: Jun. 6, 2017

(54) ADHESIVE COMPOSITIONS AND USE THEREOF

(71) Applicant: Kronotec AG, Lucerne (CH)

(72) Inventor: Norbert Kalwa, Horn-Bad Meinberg (DE)

(73) Assignee: SWISS KRONO Tec AG, Lucerne (CH)

( * ) Notice: Subject to any disclaimer, the term of this patent is extended or adjusted under 35 U.S.C. 154(b) by 187 days.

(21) Appl. No.: 14/374,053

(22) PCT Filed: Jan. 25, 2013

(86) PCT No.: PCT/EP2013/051393
§ 371 (c)(1),
(2) Date: Jul. 23, 2014

(87) PCT Pub. No.: WO2013/110738
PCT Pub. Date: Aug. 1, 2013

(65) Prior Publication Data
US 2015/0013878 A1   Jan. 15, 2015

(30) Foreign Application Priority Data
Jan. 26, 2012 (EP) .................................... 12152583

(51) Int. Cl.
| C08G 65/32 | (2006.01) |
| C09J 161/24 | (2006.01) |
| C09J 161/20 | (2006.01) |
| C09J 161/34 | (2006.01) |
| C08L 61/20 | (2006.01) |
| B32B 21/02 | (2006.01) |
| C08G 71/02 | (2006.01) |
| B32B 21/00 | (2006.01) |

(52) U.S. Cl.
CPC ............ *C09J 161/24* (2013.01); *B32B 21/02* (2013.01); *C08L 61/20* (2013.01); *C09J 161/20* (2013.01); *C09J 161/34* (2013.01); *B32B 21/00* (2013.01); *B32B 2264/04* (2013.01)

(58) Field of Classification Search
CPC .................................................... C08L 67/02
USPC ........... 156/307.1; 525/181, 329.9, 419, 432, 525/457, 540, 406, 88, 110, 205
See application file for complete search history.

(56) References Cited

U.S. PATENT DOCUMENTS

| 5,179,143 A | 1/1993 | König et al. |
| 6,297,313 B1 | 10/2001 | Hsu |
| 6,316,539 B1 | 11/2001 | Hobisch et al. |
| 6,465,104 B1 | 10/2002 | Krebs et al. |
| 6,478,998 B1 | 11/2002 | Miller et al. |
| 2002/0143085 A1 | 10/2002 | Yoshida et al. |
| 2003/0092855 A1 | 5/2003 | Miller et al. |
| 2007/0054144 A1 | 3/2007 | Dopico et al. |
| 2014/0371382 A1* | 12/2014 | Holvoet ............. C08G 18/4837 524/542 |

FOREIGN PATENT DOCUMENTS

| EP | 0018061 A1 | 10/1980 |
| EP | 0352558 A2 | 1/1990 |
| EP | 0516361 A1 | 12/1992 |
| GB | 1444933 A | 8/1976 |
| GB | 1523601 A | 9/1978 |
| GB | 2018796 A | 10/1979 |
| JP | 08067864 | 12/1996 |
| JP | 2013108000 | 6/2013 |
| WO | WO-0222332 A1 | 3/2002 |

OTHER PUBLICATIONS

International Preliminary Report on Patentability for PCT Application PCT/EP2013/051393, dated Aug. 14, 2014; 9 Pages.

* cited by examiner

*Primary Examiner* — Terressa Boykin
(74) *Attorney, Agent, or Firm* — Andrew M. Calderon; Roberts Mlotkowski Safran Cole & Calderon, P.C.

(57) ABSTRACT

The present invention relates to new formulations for adhesive compositions and also to adhesive compositions particularly for a hybrid adhesive comprising at least one mixture of an amino resin and at least one polyether, and the combination of this mixture with isocyanate, and also to the use of polyethers in adhesives based on amino resins. These adhesive compositions are especially suitable for use as adhesives for woodbase materials, more particularly OSB boards, fiberboards, or chipboards. In a further aspect the present invention relates to processes for producing such woodbase materials from lignocellulosic products of comminution, more particularly to processes for producing OSB boards, wood fiberboards, or chipboards, where the lignocellulosic products of comminution are contacted with the adhesive composition of the invention and subsequently the woodbase materials are obtained by pressing with heat treatment. Lastly, the present invention is directed to woodbase materials obtainable accordingly.

23 Claims, 1 Drawing Sheet

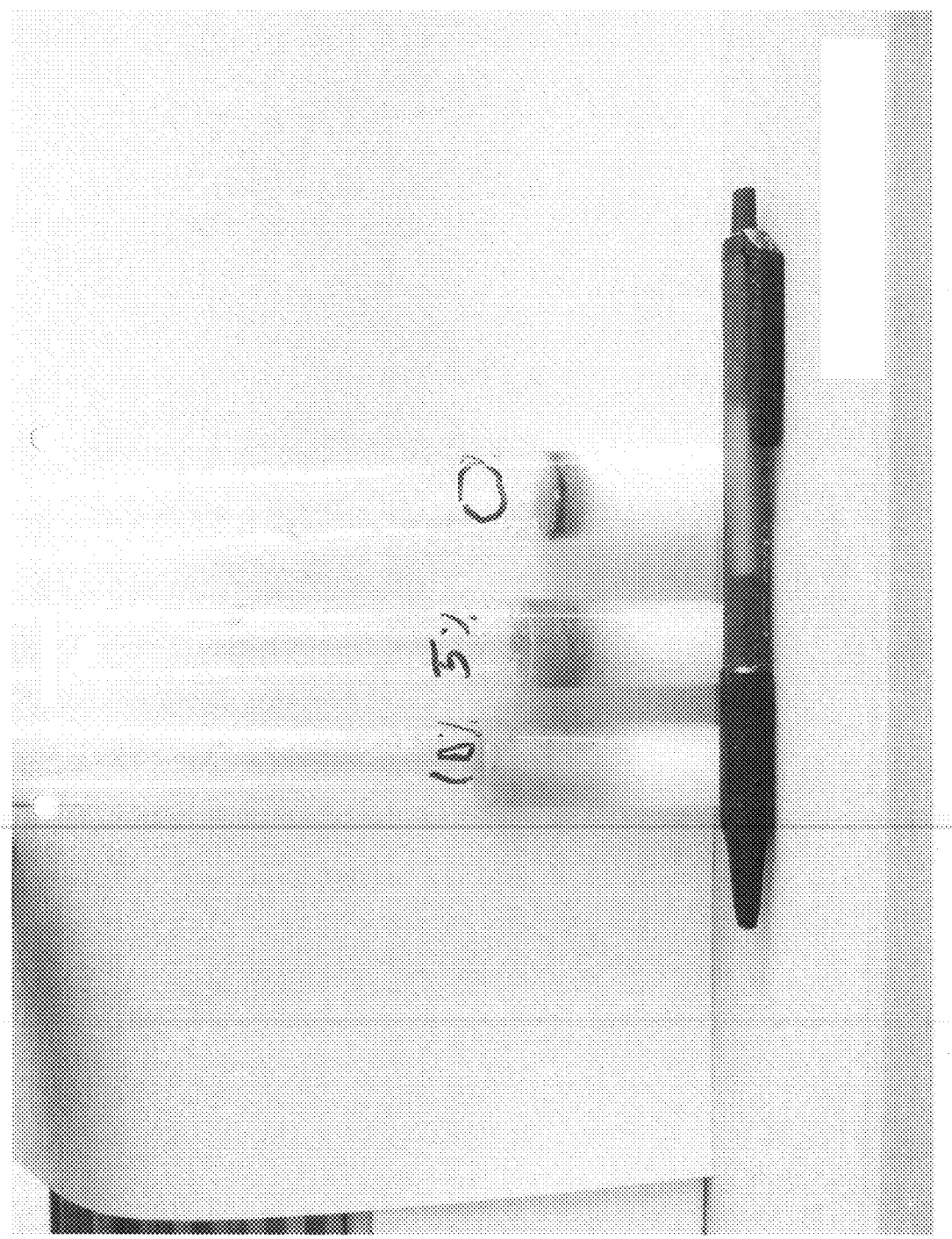

ADHESIVE COMPOSITIONS AND USE THEREOF

The present invention relates to new formulations for adhesive compositions and also to adhesive compositions particularly for a hybrid adhesive comprising at least one mixture of an amino resin and at least one polyether, and the combination of this mixture with isocyanates, and also to the use of polyethers in adhesives based on amino resins. These adhesive compositions are especially suitable for use as adhesives for woodbase materials, more particularly OSB boards, fiberboards, or chipboards. In a further aspect the present invention relates to processes for producing such woodbase materials from lignocellulosic products of comminution, more particularly to processes for producing OSB boards, wood fiberboards, or chipboards, where the lignocellulosic products of comminution are contacted with the adhesive composition of the invention and subsequently the woodbase materials are obtained by pressing with heat treatment. Lastly, the present invention is directed to woodbase materials obtainable accordingly.

PRIOR ART

The gluing of woodbase materials has for years used essentially three different kinds of adhesive. These are adhesives based on amino resin, such as those based on urea-formaldehyde; adhesives based on phenol-formaldehyde; and diisocyanate adhesives. Urea resins in accordance with DIN 7728 are aminoplasts which can be prepared as condensation products from the urea and/or urea derivatives and aldehydes, and more particularly formaldehyde, and may customarily be cured thermally. These urea resins, also referred to as UF resins, are employed both as dried powder adhesives and in liquid form.

On account of the low costs, urea resins find extensive application in the field of the production of woodbase materials. Moreover, urea resins exhibit good dry binding strength. Urea resins, such as urea-formaldehyde resins, but also phenol-formaldehyde resins, are reinforced with melamine resins to improve the mechanical properties and/or the water resistance.

Urea resins form part of the group of the thermosets, which cure via polycondensation reaction. Their reaction, though quick, leads to very hard and brittle macromolecules. Furthermore, the water-solubility of these two adhesives is not particularly good, meaning that these adhesives have to be used in a concentration range of 50 wt % to 70 wt % solids content. These qualities, however, in the case of application to wood, for example, are negative with regard to the distribution of the adhesives and to the wetting of the material to be bonded. In other words, customarily, the distribution of the adhesive that is achieved by spray application, for example, improves in proportion to the extent to which the adhesive used is diluted. Although the urea resins do provide the most favorable solution from the standpoint of costs in the production of woodbase materials, the results they furnish are poorer than those of other adhesives in terms of the quality of the bonding. In respect of their reactivity, moreover, these adhesives are less amenable to influence than other adhesives, such as isocyanate adhesives, for example.

When urea adhesives are combined with other non-urea resin adhesives, phenolic resin adhesives or melamine resin adhesives, in order, for example, to overcome the above-described disadvantageous qualities of the urea resins, the problem frequently occurs of incompatibilities between the individual adhesives, or mixing problems. Correspondingly, mixtures of the individual adhesive components cannot be easily produced. Instead, instances of phase separation may occur, leading to heterogeneity in bonded regions. Furthermore, the bonding properties may be very different, including kinetics, structure, and morphology. In order to overcome this problem, a variety of improvements have been proposed:

The use of surfactants is intended to improve the miscibility. Modification of amino resin or particularly isocyanate is intended to improve the compatibility. Specific mixing techniques are intended to allow improved mixing of the individual components. All of the proposals, however, have shown both technical and economic disadvantages. For instance, WO 02/22332 describes a hybrid resin of phenolic-formaldehyde resins and isocyanate resins, where the phenolic-formaldehyde resins are protected for the purpose of improving the stability. U.S. Pat. No. 6,465,104 B1 describes hotmelt adhesives with modified polyurethanes, which comprise substantially polycarboxylic esters, polyols, and polyisocyanates. These individual components are mixed as solids.

The urea resins stated above find application as adhesives in the fiberboard sector in particular. In regions with high humidity or even on direct exposure to water, however, the use of such fiberboards with urea-based adhesives is barely possible, since these adhesives are not hydrolysis-resistant.

SUMMARY OF THE INVENTION

There is therefore a need for new adhesive compositions which overcome the disadvantages stated above. The intention, therefore, is to provide urea-based adhesives which have a higher stability toward moisture exposure and permit an improved reaction with other adhesives. The adhesive, moreover, is to exhibit a higher elasticity and reduced brittleness. The chemical stability is preferably enhanced, and in addition a reduced emission of formaldehydes and other volatile or highly volatile organic compounds is achieved.

The present invention is based correspondingly on the object of providing such adhesives. A further aspect is the use of these adhesives in the production of corresponding woodbase materials, and also these woodbase materials themselves. The invention further provides the use of polyethers for improving the miscibility of amino resins with other adhesives, and also processes for producing adhesives containing amino resin, more particularly adhesives containing urea, where a polyether is admixed to the amino resin. The application is directed, lastly, at processes using the new adhesives.

BRIEF DESCRIPTION OF DRAWINGS

The FIGURE shows the samples represented in table 1, after mixing.

DESCRIPTION OF THE INVENTION

The object of the present invention is achieved through provision of new formulations for adhesive compositions, and adhesive compositions, which are suitable in particular for hybrid adhesives, with a first component formed from at least one amino resin such as urea resin, and from at least one polyether.

The expression "amino resins" refers to condensation products of aldehydes, more particularly formaldehyde, and compounds containing amino groups, more particularly urea, melamine, benzoguanamine, glycoluril, acetoguanamine, biuret, and mixtures thereof.

The expression "urea resin" is understood presently to refer to a condensation product of urea and/or urea derivatives with aldehydes, more particularly formaldehyde, which may be cured chemically and/or thermally. The urea resins, also referred to as UF resins, may additionally have further constituents, such as melamine, in order to form melamine-urea-formaldehyde resins, and/or such as phenol, in order to form urea-phenol-formaldehyde resins, and/or combinations thereof, in order to form melamine-urea-phenol-formaldehyde resins.

The expression "polyethers" is understood presently to refer to compounds having at least one ethylene oxide unit or propylene oxide unit and at least one isocyanate-reactive group, this isocyanate-reactive group being selected from a group encompassing hydroxyl, amino, epoxy, and thiol, preferably hydroxyl.

The expression "isocyanates" is understood presently to refer to monomeric, dimeric, oligomers, and polymeric isocyanates, unless otherwise stated.

The polyether used herein may be a mixture of different alkoxylation products of polyols. Preferred polyols include those in which there are polymerized propylene oxide units and/or polymerized ethylene oxide units. These units may be randomly distributed in the form of polyethylene oxide blocks within these chains and/or ends.

The expression "polyether" embraces at least one ethylene oxide unit or propylene oxide unit. It relates to units of the formula (—$CH_2$—$CH_2$—O—, ethylene oxide, and/or —$CH_2$—$CH_2$—$CH_2$—O—, propylene oxide). The polyethers used in accordance with the invention are preferably polyols.

The expression "polyol" refers presently to compounds which comprise two or more hydroxyl groups (OH). Polyols may also be referred to as polyalcohols. Polyols may be present both in linear and in cyclic forms. Polyols are more particularly those alcohols which represent an oligomer or polymer of short-chain alcohols, such as polyalkylene glycols or oligomeric glycerols.

The expression "hybrid adhesives" refers to adhesives or resins which are composed of at least two components.

The expressions "encompass" or "encompassing" and also "comprise" or "comprising", which are used synonymously herein, should be understood as open formulations and do not rule out the presence of further constituents. It is clear that these expressions encompass the embodiment of the exclusory expressions "consist" or "consisting".

In one preferred embodiment the adhesive composition of the invention is a composition wherein the polyol is a polyalkylene glycol, an oligomeric glycerol, or an oligo- or polysaccharide.

In one particularly preferred embodiment the polyether in the adhesive composition of the invention is a polyol with the general formula (I):

where $R_1$ independently at each occurrence is selected from H, OH, $OR_4$, or $C(O)$—$R_5$; where
$R_4$ independently at each occurrence is selected from hydrogen or a $C_1$-$C_6$ alkyl group;
$R_5$ is independently at each occurrence selected from hydrogen, OH, $OR_4$, or $N(R_4)_2$;
$R_2$ and $R_3$ are selected independently of one another from hydrogen or a hydrocarbon which may contain heteroatoms;

x independently at each occurrence is an integer from 1 to 10;
n is an integer from 1 to 30; preferably 1 to 20.

This polyol has at least two hydroxyl groups, such as at least three hydroxyl groups.

The polyol is for example, in particular, polyethylene glycol or polypropylene glycol with preferably average molecular masses of 62 to 2000 g/mol, preferably one with an average molecular mass of 100 to 800 g/mol.

In other words, it is especially preferred for the polyol component to constitute a short-chain polydiol or triol, such as an ethylene glycol, propylene glycol, butylene glycol, or oligomers or polyols thereof. It further comprises corresponding oligomers or polymers of mixtures of these components. These components may be present alone or as mixtures.

Examples of polyethers of the kind that may be used in accordance with the invention preferably include those obtained by polymerization of ethylene oxide, including products obtained by copolymerization of ethylene oxide with other cyclic oxides, propylene oxide for example, in the presence of an initiator compound, preferably in the presence of at least one or more polyfunctional initiators. Suitable initiator compounds comprising a multiplicity of active hydrogen atoms and encompassing water and low-molecular-weight polyethane, e.g., ethylene glycol, propylene glycol, diethylene glycol, dipropylene glycol, cyclohexanedimethanol, resorcinol, bisphenol A, glycerol, trimethylolpropane, 1,2,6-hexanetriol, pentaerythritol, and the like. Mixtures thereof and corresponding cyclic oxides can be used.

It has surprisingly been found that the polyethers improve the miscibility of the amino resins, such as the urea resins, with other adhesives. This means that when the amino resins, such as the urea resins, are mixed with another adhesive, such as isocyanate-based adhesives, prior mixing with the polyol is able to improve the miscibility with the further adhesive.

It is preferable for the amino resin to be a urea resin, more particularly one selected from urea-formaldehyde resin, melamine-urea-formaldehyde resin, melamine-urea-phenol-formaldehyde resin, or mixtures thereof.

The amount of polyether, more particularly polyol, based on the amount of amino resin is preferably in a range from 0.1 to 20 wt %, such as 0.1 to 15 wt %, e.g., 0.5 to 10 wt %, such as 2 to 8 wt %, e.g., up to 9, 8, 7, 6, 5 or 4 wt %, and minimally at least 0.5, 1, 2 or 3 wt %.

In certain embodiments the polyether may be present in an amount of at least 0.01 wt %, based on 100 wt % of the adhesive composition with first and second components. Preferably the polyether is present in an amount of at least 0.05, such as 0.1 wt %, preferably 0.3 wt %, such as preferably 0.5 wt %, based on 100 wt % of the composition.

In view of the presence of polyether, such as polyol, in the amino resin, more particularly urea resin, it is possible to mix the amino resin with other adhesives, such as isocyanates and epoxy resins, but optionally also phenolic resins, melamine resins, polyurethane resins, protein-phenolic adhesives, polyacrylates, formaldehyde-free adhesives based on polymerized acrylic acids, and other aqueous adhesive systems, in order to obtain—among others—hybrid adhesives.

The second adhesive here is preferably at least one epoxide or isocyanate, more particularly an isocyanate selected from the group containing aliphatic and aromatic isocyanates.

In other words, in accordance with the invention, the adhesive composition or the formulation for an adhesive composition encompasses an isocyanate as second component. In one embodiment the isocyanate encompasses at least one polycyanate compound.

Stated below by way of example are suitable polyisocyanates which may be used in accordance with the invention: organic polyisocyanate compounds or mixtures of organic polyisocyanate compounds, preferably where these compounds have at least two isocyanate groups. Examples of organic polyisocyanates including: diisocyanates, more particularly aromatic diisocyanates and isocyanates with higher functionality. Examples thereof further include aliphatic isocyanates, such as hexamethylene diisocyanate and aromatic diisocyanates, such as diphenylmethane diisocyanate (MDI) in the form of the 2,4', 2,2', and 4,4' isomers and mixtures thereof (also referred to as pure MDI), mixtures of diphenylmethane diisocyanate (MDI) and oligomers thereof (referred to as polymeric MDI), m- and p-phenylene diisocyanate, tolylene 2,4- and tolylene 2,6-diisocyanate (also known as toluene diisocyanate TDI), such as 2,4-TDI and 2,6-TDI in a suitable isomeric mixture, chlorophenylene 2,4-diisocyanate, naphthalene 1,5-diisocyanate, diphenylene 4,4'-diisocyanate, 4,4'-diisocyanate-3,3'-dimethylbiphenyl, 3-methyldiphenylmethane 4,4'-diisocyanates, and diphenyletha diisocyanate, and also cycloaliphatic diisocyanates, such as cyclohexane 2,4- and 2,3-diisocyanate, 1-methylcyclohexyl 2,4- and 2,6-diisocyanate, and mixtures thereof, and bis-isocyanato-cyclohexyl)methane (e.g., 4,4'-diisocyanatodicyclo-hexylmethane (H12MDI), triisocyanates, such as 2,4,6-triisocyanatotoluene and 2,4,4-triisocyanatodiphenyl ether, isophorone diisocyanate (IPDI), butylene diisocyanate, trimethylhexamethylene diisocyanate, isocyanatomethyl-1,8-octane diisocyanate, tetramethylxylene diisocyanate (DMXDI), 1,4-cyclohexane diisocyanate (CDI), and tolidine diisocyanate (TODI).

Modified polyisocyanates containing isocyanurate, carbodiimide or uretonimine groups may likewise be employed. In addition, blocked polyisocyanates may be used, such as reaction products of phenol or an oxime in a polyisocyanate, preferably a blocked polyisocyanate having a deblocking temperature below the temperature employed if the polyisocyanate composition is utilized. Mixtures of isocyanates can be used.

In one embodiment the isocyanate may also be an emulsifiable polyisocyanate. Suitable emulsifiable isocyanates may be, for example, emulsifiable MDIs, as disclosed in EP 18061, EP 516361, GB 1523601, GB 1444933 or GB 2018796. Suitable emulsifiable polyisocyanates are available commercially inter alia from Huntsman under the trademark Suprasec, e.g., Suprasec 1042, Suprasec 2405, Suprasec 2408, and Suprasec 2419 from Huntsman, USA.

Preferred representatives of aliphatic isocyanates are, for example, hexamethylene diisocyanate (HDI), isophorone diisocyanate (IPDI), and 1,4-cyclohexyl diisocyanate (CHDI). Preferred aromatic polyisonates include polymeric diphenylmethane diisocyanate (PMDI), tolylene diisocyanate (TDI), and diphenylmethane diisocyanate (MDI). With particular preference, the second adhesive present in the adhesive composition of the invention is an adhesive based on diisocyanates, particularly PMDI.

The amount of the isocyanate relative to the urea resin is preferably in a range from 0.5 wt % to 40 wt %. Particularly preferred are the amounts in the range from 10 to 30 wt %, such as 15 to 25 wt %, more particularly 20 wt %, based on the amount of urea resin.

In certain embodiments the at least one isocyanate may be present in an amount of at least 0.5 wt %, based on 100 wt % of the overall formulation, as for example in an amount of at least 10 wt % such as at least 15 wt %, based on the overall amount of the formulation or adhesive composition. The at least one isocyanate may be present, for example, in an amount of 0.5 to 60 wt %, such as 5 to 40 wt %, e.g., 10 to 30 wt %, based on 100 wt % of the overall formulation.

In one embodiment the formulation or the hybrid adhesive composition consists of a mixed component comprising amino resin as defined above and a polyether as defined above, and a further component comprising an isocyanate as defined above.

The adhesive composition of the invention may in this case be present such that in the production thereof the polyether is first mixed with the amino resin and subsequently a possible further component is added, before the composition is then used as an adhesive composition. In accordance with the present invention the adhesive composition is preferably in the form of a hybrid adhesive composition in at least two separate components or as a formulation of two components. In this case one component has the amino resin and polyether mixed with one another, and the at least second component has the further adhesive, such as the isocyanate adhesive. It is especially preferred for the polyether to be mixed with the amino resin first when the adhesive composition is produced. Subsequently a further adhesive, the isocyanate adhesive for example, may be admixed. The admixing of the further adhesive takes place preferably immediately prior to curing, in order to prevent the second adhesive, such as isocyanate, reacting with the polyether. In other words, the operation takes place preferably as late as possible, in order to avoid instances of premature curing.

In one preferred embodiment, therefore, the mixture of amino resin and polyether separately or, preferably, as a mixture is first applied, and the second component is applied with the isocyanate immediately before curing of the adhesive.

In certain embodiments the formulation of the invention or adhesive composition of the invention may include at least one further additive. These additives may be of the kind selected from the group of a hardener, a surfactant, a wax, or a pigment. Adjuvants suitable accordingly are known to the skilled person. The skilled person is also aware of suitable amounts for the addition of these adjuvants to the overall formulation.

It has been found that the mixture of polyether with amino resin allows mixing with further adhesives, with little or no phase formation in the mixtures.

In one embodiment in accordance with the invention, the component here is present at least partly, such as completely, for example, in liquid form. The mixing of the component with amino resin and polyether with the further component, such as the isocyanate component, takes place in one embodiment such that the components are present in liquid form, such as in liquid form at room temperature.

It has surprisingly been further observed that in comparison to adhesive compositions without a polyether fraction, the curing is much quicker. Thus it has been found, for example, that curing is slow in the case of a mixture of isocyanate with urea resin, whereas curing is very quick on addition of an inventive fraction of polyether, such as polyol.

This property of the polyether that has been found could not have been expected, and must therefore be considered to be surprising. The use of the hybrid adhesive composition of the invention allows the production of woodbase materials having improved properties. In particular, the use of the adhesives of the invention when producing the woodbase materials is advantageous relative to the adhesives utilized to date. On the basis of the better wettability of the woodbase materials and of the miscibility with other adhesives, the adhesives of the invention exhibit advantages. These advantages include the better miscibility with other adhesives, and also the improved curing during production, and hence the improvement in the quality of the bond. The adhesive of the invention displayed a better reaction between the individual components. After curing, the adhesive is more stable with respect to moisture exposure. Moreover, it exhibits a higher elasticity and lower brittleness, and also improved chemical stability. Finally, the emission of formaldehyde and other volatile and highly volatile organic compounds can be reduced. The adhesive composition in accordance with the present invention is especially suitable in the production of woodbase materials, such as OSB (oriented strand boards), fiberboards or chipboards.

In a further aspect, the present application is directed to a process for producing woodbase materials from lignocellulosic products of comminution, more particularly OSB boards, wood fiberboards or chipboards, comprising the process steps of:
a) contacting lignocellulosic products of comminution with a formulation for an adhesive composition and/or with the adhesive composition according to the present invention; and
b) pressing the mixture from a) with heat treatment.

Here, the components of the formulation for an adhesive composition, or the adhesive composition, comprising as a first composition amino resin and polyether and optionally, as a second composition, a different adhesive, more particularly isocyanate, may be metered in step a), i.e., in the course of contacting with the lignocellulosic products of comminution, into the lignocellulosic products of comminution.

This metered addition may take place in accordance with known methods. The formulation or adhesive composition is preferably admixed by means of blowline, mixer, or coils. Alternatively the adhesive composition of the invention may be applied as a complete mixture or in the form of the individual components, by spraying or nozzle application. The skilled person is aware of suitable methods.

It is also possible to contact the composition of the invention with the lignocellulosic products of comminution by dry gluing. The composition here is applied by extremely fine nozzle application to the dried, lignocellulosic products of comminution. Since the thermally intensive drying operation takes place essentially before gluing with the adhesive, the consumption of adhesive is significantly lower than in the case of blowline gluing, with a largely homogeneous distribution of adhesive.

The further processing of the lignocellulosic products of comminution with the adhesive composition may take place in accordance with known methods for the production of woodbase materials, e.g. woodbase material boards, such as OSBs, fiberboards, and chipboards. Accordingly, after scattering of the strands or fibers, with preliminary pressing if desired, the mixture can be pressed with heat treatment. This hot pressing takes place in accordance with known methods and under known conditions.

The lignocellulosic products of comminution are preferably selected from wood chips, wood strands and wood fibers.

It is possible accordingly to produce woodbase materials of the invention. These woodbase materials are, more particularly, fiberboards, such as HDF (high-density fiberboard) and MDF (medium-density fiberboard) boards, but also OSB boards and chipboards.

The woodbase materials here are bonded using the adhesive composition of the invention, and/or obtainable by the process of the invention.

In a further aspect, the present invention is directed to the use of polyethers for improving the miscibility of amino resins with other adhesives, more particularly adhesives based on isocyanate or based on epoxy. The use of polyether in such adhesive compositions of mixtures comprising amino resin with other adhesives shows an improvement in the miscibility of these amino resins with the further adhesives. Furthermore, improved curing properties and, in association therewith, improved bonding properties have been found. Through the use of the polyether it is possible to modify the miscibility of amino resins on subsequent admixing of other adhesives, and thereby to improve the cure rate, but also the homogeneity in bonding when using adhesive compositions encompassing an amino resin and a further adhesive.

Lastly, the present invention provides a process for producing adhesive compositions comprising an amino resin adhesive. This process encompasses in a first step the mixing of the amino resin adhesive with a polyether, as described herein. Subsequently this mixture of amino resin from polyether is mixed with an at least second adhesive, in order to obtain an adhesive composition with an amino adhesive, polyether, and an at least second adhesive. This at least second adhesive here is preferably an isocyanate adhesive.

The invention is illustrated below by means of a working example, without the invention being confined to this example.

Example

Urea resins were mixed with different amounts of polyol (polyol 200, average molar weight 200 g/mol) and then an isocyanate adhesive of a kind used in the woodbase material industry was added. The components were mixed thoroughly with one another. For comparison, an adhesive composition comprising a mixture of isocyanate and urea resin was prepared without addition of a polyol. As illustrated in table 1 below, the addition of polyol in small amounts led to a reduction in phase formation in the mixtures. The tendency to form phases with increasing polyol content decreased significantly, as set out in the FIGURE. The FIGURE shows the samples represented in table 1, after mixing.

It was also possible to observe, surprisingly, that the curing of the mixture was much quicker in the presence of the polyol component.

TABLE 1

|  | Blank sample | 5% polyol 200 | 10% polyol 200 |
| --- | --- | --- | --- |
| Component I | | | |
| Urea resin | 10.0 g (66%) | 10.0 g (66%) | 10.0 g (66%) |
| Polyol polyethylene glycol 200 | — | 0.5 g (100%) | 1.0 g (100%) |
| Component II | | | |
| Isocyanate Suprasec | 2.0 g (100%) | 2.0 g (100%) | 2.0 g (100%) |

TABLE 1-continued

|  | Blank sample | 5% polyol 200 | 10% polyol 200 |
|---|---|---|---|
| Phase formation after mixing | very significant | significant | slight |
| Curing | slow | faster | very quick |

The invention claimed is:

1. A formulation for a hybrid adhesive composition with a component formed from i) at least one amino resin which is a condensation product of an aldehyde with a compound from the group of urea, melamine, benzoguanamine, glycoluril, acetoguanamine, biuret, or mixtures thereof, and ii) at least one polyether which comprises at least one ethylene oxide unit or propylene oxide unit and at least one isocyanate reactive group selected from the group encompassing hydroxyl, amino, epoxy, and thiol, present with i) and ii) as a mixture.

2. The formulation for a hybrid adhesive composition as claimed in claim 1, where the polyether is a polyalkylene glycol, an oligomeric glycerol, or an oligo- or polysaccharide, where the polyol is of the general formula (I):

$$R_3O-[(CHR_1)_x-O]_n-R_2 \quad (I)$$

where $R_1$ independently at each occurrence is selected from H, OH, $OR_4$, or $C(O)-R_5$, where $R_4$ independently at each occurrence is selected from hydrogen or a $C_1$-$C_6$ alkyl group;

$R_5$ is, independently at each occurrence, selected from hydrogen, OH, $OR_4$, or $N(R_4)_2$;

$R_2$ and $R_3$ are selected independently of one another from hydrogen or a hydrocarbon which may contain heteroatoms;

x independently at each occurrence is an integer from 1 to 10;

n is an integer from 1 to 30.

3. The formulation for a hybrid adhesive composition as claimed claim 1, where an amount of polyether, based on the amino resin, is in a range from 0.1 to 20 wt %.

4. The formulation for a hybrid adhesive composition as claimed in claim 1, where the amino resin is a urea resin.

5. The formulation for a hybrid adhesive composition as claimed in claim 1, with at least one further component comprising a further adhesive-based on isocyanates.

6. The formulation for a hybrid adhesive composition as claimed in claim 5, comprising a first component comprising at least one amino resin mixed with at least one polyether, and a second component which is an adhesive based on isocyanates.

7. The formulation for a hybrid adhesive composition as claimed in claim 5, where the at least one isocyanate is selected from the group consisting of hexamethylene diisocyanate, m- and p-phenylene diisocyanate, tolylene 2,4- and tolylene 2,6-diisocyanate, diphenylmethane diisocyanate in the form of the 2,4', 2,2', and 4,4' isomers and mixtures thereof, mixtures of diphenylmethane diisocyanates and oligomers thereof, chlorophenylene 2,4-diisocyanate, naphthylene 1,5-diisocyanate, diphenylene 4,4'-diisocyanate, 4,4'-diisocyanate-3,3'-dimethylphenyl, 3-methyldiphenylmethane 4,4'-diisocyanate, diphenyl ether diisocyanate, cyclohexane 2,4- and 2,3-diisocyanate, 1-methylcyclohexyl 2,4- and 2,6-diisocyanate, bis(isocyanatocyclohexyl)methane, 2,4,6-triisocyanatotolkol, 2,4,4-triisocyanatodiphenyl ether, isophorone diisocyanate, butylene diisocyanate, trimethylhexamethylene diisocyanate, isocyanatomethyl-1,8-octane diisocyanate, tetramethylxylene diisocyanate, 1,4-cyclohexane diisocyanate, toluene diisocyanate, and mixtures thereof.

8. The formulation for a hybrid adhesive composition as claimed in claim 1, where the amount of amino resin is at least 30 wt %, based on 100 wt % of an overall formulation.

9. The formulation for a hybrid adhesive composition as claimed in claim 5, where the at least one isocyanate is present with an amount of at least 0.5 wt % based on 100 wt % of an overall formulation.

10. A hybrid adhesive composition comprising a formulation as claimed in claim 1 with at least one further component comprising an adhesive-based on isocyanates.

11. A method of producing woodbased material comprising the components of claim 1.

12. The formulation or hybrid adhesive composition as claimed in claim 1, wherein the polyether is first mixed with the amino resin, for improving miscibility of amino resins with other adhesives which are added subsequently to the hybrid adhesive composition.

13. A process for producing woodbase materials from lignocellulosic products of comminution, comprising the process steps of:
  a) contacting lignocellulosic products of comminution with a formulation for a hybrid adhesive composition comprising the components of claim 1; and
  b) pressing the mixture from a) with heat treatment.

14. The process as claimed in claim 13, wherein the components of the formulation or of the hybrid adhesive composition, comprising as a first composition a mixture of amino resin and polyether and optionally, as a second composition of an adhesive different than the hybrid adhesive composition, are metered in step a) into the lignocellulosic products of comminution.

15. A woodbase material comprising a hybrid adhesive composition as claimed in claim 10 in the form of fiber boards or OSB boards.

16. A process for producing hybrid adhesive compositions comprising an amino resin which is a condensation product of an aldehyde with a compound from the group of urea, melamine, benzoguanamine, glycoluril, acetoguanamine, biuret, or mixtures thereof and a second adhesive, more particularly isocyanates, comprising the step of mixing the amino resin with a polyether as defined in claim 1 and subsequently mixing this resultant amino resin/polyether mixture with the second adhesive.

17. The process as claimed in claim 16 for producing a hybrid adhesive composition from a mixture comprising amino resin and polyether and also isocyanate, where in a first step the amino resin is mixed with the polyether and subsequently this mixture of amino resin and polyether is mixed with an isocyanate.

18. The formulation or hybrid adhesive composition as claimed in claim 1, produced by mixing (i) a urea resin selected from urea-formaldehyde resin, melamine-urea-formaldehyde resin, melamine-urea-phenol-formaldehyde resin, protein-phenolic resins, polyacrylates, formaldehyde-free resins based on polymerized acrylates, or mixtures thereof and (ii) the at least one isocyanate selected from the group consisting of hexamethylene diisocyanate, m- and p-phenylene diisocyanate, tolylene 2,4- and tolylene 2,6-diisocyanate, diphenylmethane diisocyanate in the form of the 2,4', 2,2', and 4,4' isomers and mixtures thereof, mixtures of diphenylmethane diisocyanates and oligomers thereof, chlorophenylene 2,4-diisocyanate, naphthylene 1,5-diisocyanate, diphenylene 4,4'-diisocyanate, 4,4'-diisocyanate-3, 3'-dimethylphenyl, 3-methyldiphenylmethane 4,4'-diisocyanate, diphenyl ether diisocyanate, cyclohexane 2,4- and 2,3-diisocyanate, 1-methylcyclohexyl 2,4- and 2,6-diisocyanate, bis(isocyanatocyclohexyl)methane, 2,4,6-triisocyanatotolkol, 2,4,4-triisocyanatodiphenyl ether, isophorone diisocyanate, butylene diisocyanate, trimethylhexamethylene diisocyanate, isocyanatomethyl-1,8-octane diisocyanate, tetramethylxylene diisocyanate, 1,4-cyclohexane diisocyanate, toluene diisocyanate, and mixtures thereof.

19. The formulation for a hybrid adhesive composition as claimed in claim 2, where the polyol is a polyethylene glycol or polypropylene glycol having average molecular masses of 62 to 4000.

20. The formulation for a hybrid adhesive composition as claimed in claim 4, where the urea resin is selected from urea-formaldehyde resin, melamine-urea-formaldehyde resin, melamine-urea-phenol-formaldehyde resin, protein-phenolic resins, polyacrylates, formaldehyde-free resins based on polymerized acrylates, or mixtures thereof.

21. The method of producing woodbased material of claim 11, wherein the woodbased material is OSB boards, fiberboards, or chipboards.

22. The process as claimed in claim 14, wherein the hybrid adhesive composition are applied by blowline, mixer, or coil.

23. The process as claimed in claim 14, wherein the different adhesive is and isocyanate based adhesive.

* * * * *